United States Patent [19]

Fahrenholz

[11] 4,345,655
[45] Aug. 24, 1982

[54] ROCK PICKER WITH STORAGE CONVEYORS

[76] Inventor: Harley D. Fahrenholz, P.O. Box 278, Clarissa, Minn. 56440

[21] Appl. No.: 190,373

[22] Filed: Sep. 24, 1980

[51] Int. Cl.³ .............................................. A01B 43/00
[52] U.S. Cl. .................................... 171/63; 198/431; 171/110
[58] Field of Search ..................... 171/63, 64, 65, 110, 171/138; 198/857, 502, 505, 572, 575, 577, 431

[56] References Cited

U.S. PATENT DOCUMENTS

| | | | |
|---|---|---|---|
| 2,479,719 | 8/1949 | Boylan | 171/65 |
| 3,416,619 | 12/1968 | McClusky | 198/505 |
| 3,450,249 | 6/1969 | Poll | 198/431 |
| 3,782,477 | 1/1974 | Fahrenholz | 171/12 |
| 4,034,846 | 7/1977 | Burgis et al. | 198/431 |

*Primary Examiner*—Robert A. Hafer

*Attorney, Agent, or Firm*—Kinney, Lange, Braddock, Westman and Fairbairn

[57] ABSTRACT

A rock picker has a plurality of high capacity conveyors, one of which is used for storing rocks during the picking operation. The conveyors quickly unload the stored rocks into a truck or at some other desired location. The storage conveyor is arranged so that it does not take up any substantial amount of space greater than the rock picker frame, but yet is sufficiently large in capacity so that it can store a large number of rocks as they are picked. Loading conveyors are sequentially placed so that first and second normally continuously operating conveyors load into the third storage conveyor in sequence. A storage hopper is provided at the input end of the storage conveyor, and the conveyor is intermittently operated to carry the rocks from the hopper in a layer along the length of the storage conveyor. When the storage conveyor is loaded with rocks, the storage conveyor is run to discharge the rocks off one end.

6 Claims, 8 Drawing Figures

ROCK PICKER WITH STORAGE CONVEYORS

BACKGROUND OF THE INVENTION

1. Field of the Invention

The present invention relates to rock pickers having a storage and discharge conveyor.

2. Prior Art

In the prior art, rock pickers have been known, and some of these rock pickers have used rock conveyors. For example, my own U.S. Pat. No. 3,782,477 shows a rock picker with a short conveyor used for placing the rocks into a storage bin or box, which is a dump box that can be dumped once the conveyor has filled the box.

Also, various devices utilizing conveyors for conveying objects such as potatoes have been advanced. However, these conveyors generally are used only for actually conveying the material, and not for storage, and further in most instances the units are set up without a plurality of such conveyors which convey the rocks in a desired path to a storage conveyor.

SUMMARY OF THE INVENTION

The present invention relates to a rock picker which includes means for lifting rocks from the ground, and transferring the rocks through a tumbler to remove dirt and other foreign material, after which as shown, the rocks are dropped into a receiving end of a first cross conveyor at the rear of the picker. The first conveyor is a belt type conveyor that conveys the rocks upwardly and deposits the rocks into a receiving end of a second conveyor which extends longitudinally along one side of the picker and toward the front. The combination of the first and second conveyors are arranged so that the first conveyor conveys the rocks transversely to the machine and the second conveyor conveys the rocks forwardly. Both of these conveyors run substantially continuously.

A third transverse belt type storage conveyor extends across the machine at the front of the rock picker. The third conveyor has a storage hopper at its inlet end and runs in opposite direction from the first conveyor.

The third conveyor can be intermittently operated to move rocks from the hopper along the length of the belt and then stopped to refill the hopper. Thus the third conveyor is used for rock storage along its entire length. A huge capacity for rock storage is thus achieved.

When dumping is desired, the conveyors, including the third storage conveyor can be run to very rapidly remove all of the rocks being stored and deposit the rocks into a truck or at another desired location.

The device thus has high storage capacity, and can be used at a relatively high rate of speed. Further, the unloading is very rapid.

BRIEF DESCRIPTION OF THE DRAWINGS

FIG. 8 is a schematic representation of a drive arrangement utilized with the present device.

DESCRIPTION OF THE PREFERRED EMBODIMENT

Figure 1:
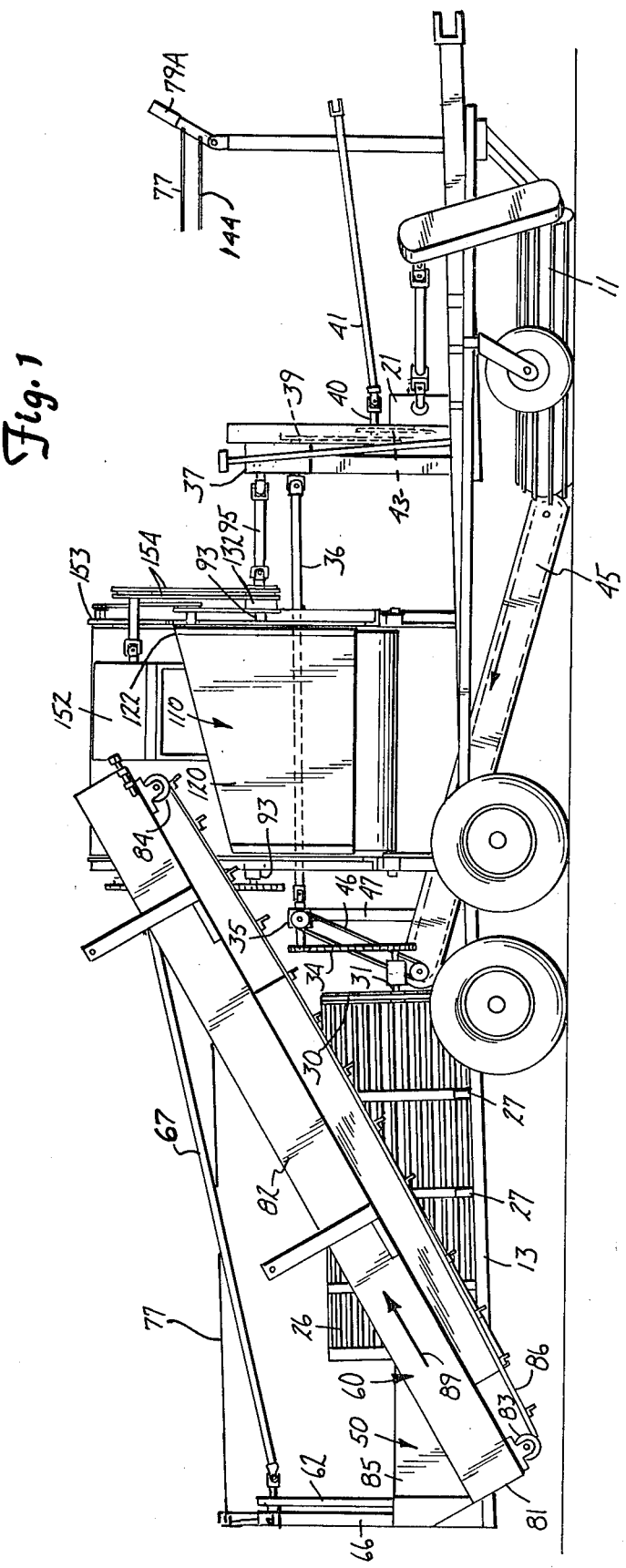
FIG. 1 is a side elevational view of a rock picker having storage and discharge conveyors made according to the present invention installed thereon.
Figure 2:
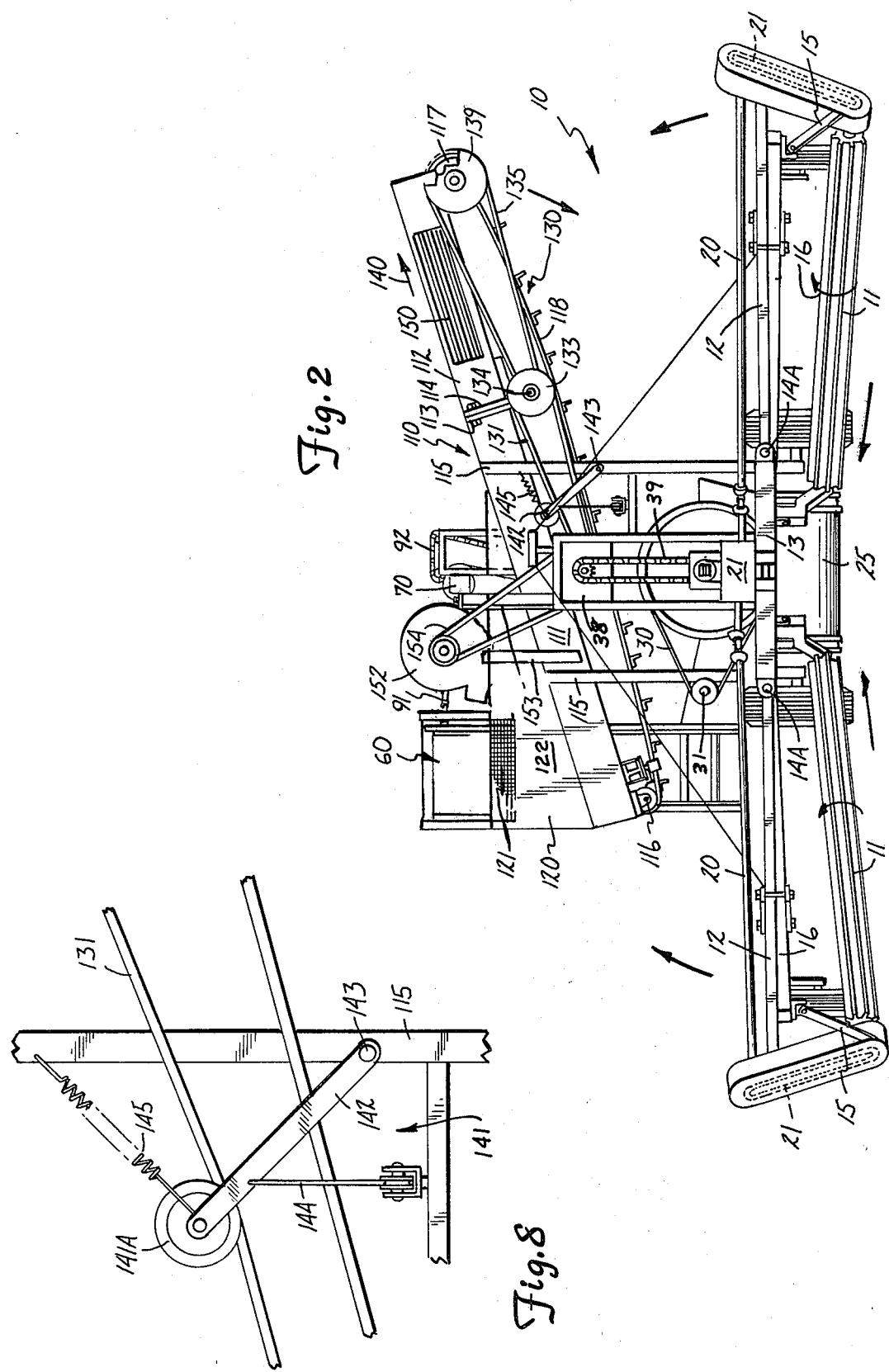
FIG. 2 is a front elevational view of the rock picker of FIG. 1.

The improvements of the present invention relate to the conveyor construction. The rock picker construction is well known in the art as shown in my previously mentioned patent, and further as shown include additions, such as windrower rollers that will sweep a wider swath of rocks in toward the center lifting and conveying mechanism of the picker. Referring first to FIGS. 1 and 2, the rock picker 10, which has the conveyors of the present invention installed thereon, includes a pair of windrowing rollers 11,11 on opposite sides of the rock picker frame. The rollers extend laterally outward to gather in rocks and urge them toward the center line of the machine. The windrowing rolls 11 are mounted on suitable frames 12, which are hingedly attached as at 14A in a suitable manner to the main frame 13 of the rock picker 10. These hinge attachments can be made through brackets as shown at 14. The inner ends of the rollers 11 are rotatably mounted on the pivot brackets 14, and the outer ends of the rolls 11 are rotatably mounted on suitable supports 15 depending from the lateral frames 12.

The rolls are rotated in the direction as indicated by the arrow 16, and move rocks which they engage toward a center line of the rock picker as previously explained. The rolls are power driven through suitable drive shafts 20,20 which in turn are connected to output shafts of a gear box 21. The outer ends of the drive shafts 20 are mounted in suitable bearings and operate through a chain and sprocket drive arrangement shown in dotted lines at 21A to rotate the rolls in the proper direction.

The roller drives are shown only schematically for explanatory purposes, and it should be understood that the rolls can be driven and mounted in any desired manner because the windrowing rolls themselves do not form a part of this invention. A typical rock windrower is shown in my U.S. Pat. No. 3,117,631.

Rocks that are guided by the rollers 11 in toward the center of the rock picker are picked up by a conveyor indicated generally at 25 that is suitably driven. This is a belt type rock conveyor and the rocks are thus conveyed upwardly into a rotating tumbler 26 that is suitably mounted on guide rollers 27 (FIG. 1) which in turn are mounted directly to the main frame 13. The mounting of the tumbler 26 is well known and is disclosed in my prior patent. The tumbler rotates about a longitudinally extending axis, and is driven by one or more belt members 30 which pass around the outer surface of one end of the tumbler. The belt 30 shown is driven from a pulley 31 mounted on a shaft that is suitably rotatably mounted relative to the frame 13, which shaft in turn is driven by a chain and sprocket set 34. The chain and sprocket 34 is driven from a gear box 35. The gear box 35 is driven in turn by a telescoping drive shaft or power take off shaft 36 which has universal joints at its opposite ends, and which is driven by a forward gear box 38 which in turn is driven by a chain and sprocket set 39 extending from a shaft 40 that is driven from a power take off shaft 41 connected to and powered by a tractor (not shown). The shaft 40 also has a second chain 43 that extends down to drive the gear box 21. The gear box 38 may be replaced by a reversing chain and sprocket drive if desired.

The rock conveyor 25 leading to the tumbler 26 has a belt 25A which is mounted on suitable rollers, and the rollers in turn are mounted on the conveyor frame 45. The upper end roller is driven by a chain and sprocket arrangement 46 from the gear box 35 as shown in FIG. 1 schematically. The gear box 35 can be mounted on suitable supports 47 as shown in FIG. 1 extending down to the main frame 13 of the rock picker.

Figure 6:
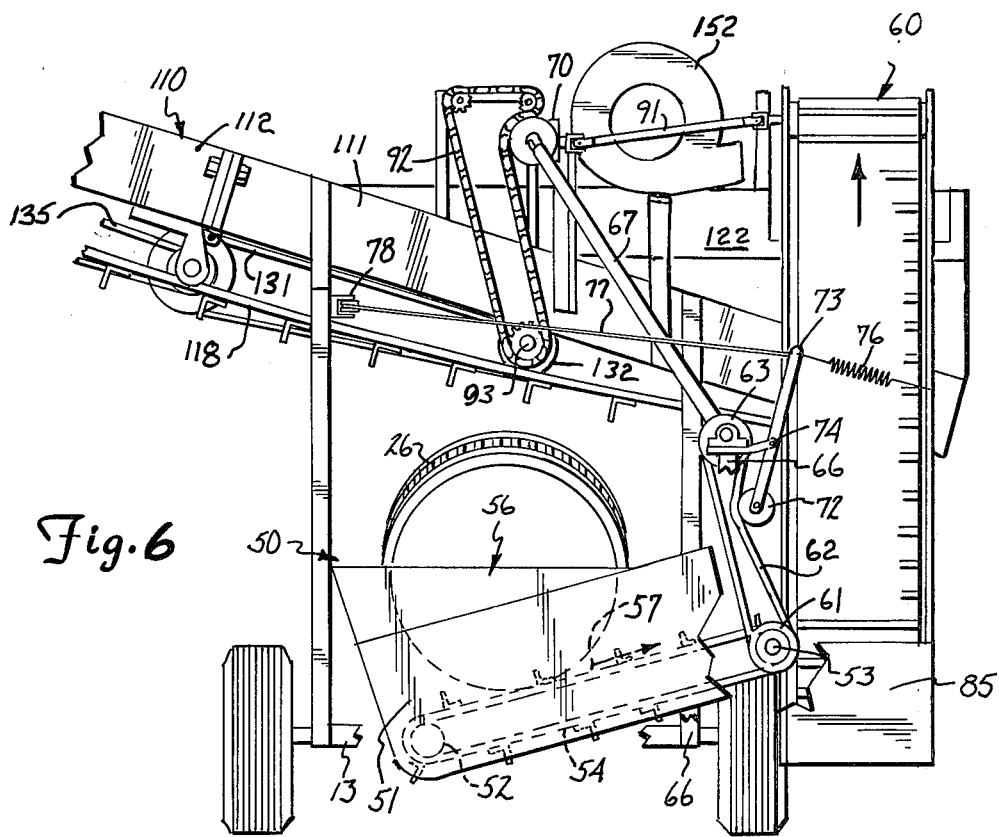
FIG. 6 is a fragmentary rear view of the rock picker showing a first conveyor drive.

Again it should be noted that the showing of the drives is very schematic because all of the portions just described are old in the art, and as rocks are moved in by the windrowing rollers 11, they are picked up by the belt 25A of the conveyor 25, and conveyed upwardly and deposited on the interior of the rotating tumbler 26 where dirt and the like will be dropped through the tumbler and separated from the rocks. The rocks then move rearwardly, as they are tumbled, and are deposited into a hopper portion of a conveyor assembly illustrated generally at 50. The conveyor assembly 50 is mounted at the rear of the frame 13 and is shown perhaps best in FIG. 6. The conveyor assembly is positioned to receive rocks from the rear end of the tumbler 26, and includes a framework 51 on which first and second rollers are mounted. The lower roller 52 can be seen in FIG. 6, and the upper roller is mounted on a suitable shaft shown at 53 in that same figure. A conveyor belt 54 is mounted over these rollers in the normal manner and, as can be seen, extends transverse to the longitudinal axis of the frame.

As can be seen, the rear wall 55 of the conveyor assembly 50 forms the rear wall of a hopper 56. The hopper receives rocks, and if desired will store some rocks. When the conveyor belt 54 is driven, the upper length or reach of the belt moves as indicated by the arrow 57 and this will convey rocks received from the tumbler upwardly until they reach the upper end of the belt, where the rocks will drop off into a second longitudinally extending conveyor assembly illustrated generally at 60.

The drive for the conveyor belt 54 of the first conveyor is through the shaft 53 where a pulley (V belt) 61 is drivably mounted. A V belt 62 then is in turn drivably mounted on a pulley 63 mounted on a short shaft 64 that is suitably mounted in bearings 65 on an upright frame 66. The shaft 64 is driven by an elongated power take off type shaft 67 which has universal joints at its opposite ends, one of which universal joints is connected to the shaft 64. The drive shaft 67 extends forwardly and is suitably driven from a gear box 70 that is mounted on a framework, as will be more fully explained.

The belt 62 is used as a clutch. The drive is engaged normally by an idler or tightener roller 72 which engages the belt. The tightener roller 72 is mounted on a lever 73 which is pivotally mounted as at 74 to a bracket on the upright frame or post 66 supporting the bearing 65. The lever 73 is urged about its pivot with a spring 76 so the roller 72 tightens the belt 62 to effect a driving connection, except when the lever 73 is moved under external force. The spring 76 is connected to an upper end of the lever 73 and a portion of the frame for the conveyor 60, so that the roller 73 keeps the belt 62 tight enough to drive the conveyor belt 54. The lever 73 is controlled by a rope 77 that passes through a pulley 78 on an upright support post 79 on the frame 13. Rope 77 extends forwardly to position where an operator of the pulling tractor can control it. The rope is controlled by a lever 79A at the front of the frame 13 where the lever can be manipulated by the operator.

Figure 7:
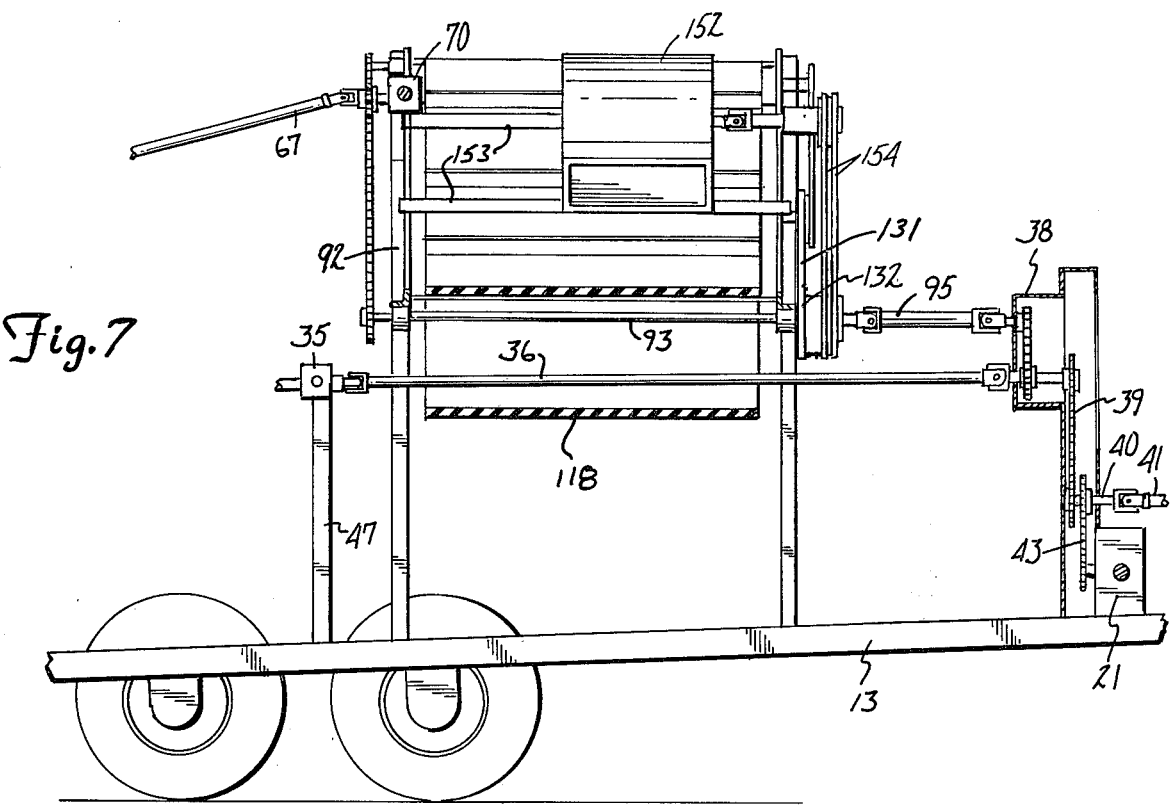
FIG. 7 is a sectional view showing the drive arrangement at the input of the rock picker.

The main frame 13 at the rear also has frame portions welded thereto as indicated at 80 which support the conveyor assembly 60. The conveyor assembly 60 also is a belt type conveyor which has a belt with cleats on it much like the belt 54 for the short conveyor. The cleats are small angle irons indicated at 54A in FIG. 7, and aid in keeping the rocks from rolling back down as they are being conveyed upwardly.

Referring to FIG. 1 in particular, the conveyor 60 includes a frame assembly 81 which has side walls 82, and such frame assembly mounts a lower roller 83 and an upper roller 84. The rollers have center shafts which are mounted in suitable bearings. The lower roller 83 is adjacent the lower end of the conveyor 60. Side walls 82 have extension portions 85 thereon at the lower end which extend upwardly from the side wall to form a hopper. The conveyor belt 86 is mounted around the rollers 83 and 84 and forms the bottom of the hopper portion.

The hopper receives the rocks from the conveyor belt 54 of first conveyor 50, and as the conveyor belt 86 is driven, the rocks will be moved upwardly as indicated by the arrow 89 in FIG. 1.

The conveyor 60 is mounted on frame 13 with suitable supports and extends longitudinally alongside the tumbler 26, back toward the front of the rock picker as shown in FIG. 1 to save space and make the machine much more compact. The conveyor belt 86 is driven by driving the roller 84 through a suitable drive shaft 91 that has universal joints at its opposite ends. The drive shaft 91 is driven from gear box 70 which is the same gear box for driving drive shaft 67 for the conveyor assembly 50. The gear box 70 is driven by a chain 92 which in turn is driven from a sprocket mounted on a shaft 93 which is driven from a second output shaft of gear box 38 through a short shaft 95 with universal joints at its opposite ends. The shaft 95 is driven from a shaft on gear box 37 different from the shaft that drives shaft 36. The shafts 95 and 93 are used for driving additional components including a fan and a third conveyor, as will be explained.

The gear box 70 is mounted on a suitable support supported from the frame 13 of the rock picker assembly.

The frame for the conveyor 60 also is supported with the frame 13 on suitable upright supports and cross members that can be arranged as desired.

The discharge end of the conveyor 60 is positioned above the inlet end of a cross storage conveyor indicated generally at 110. This storage conveyor can perhaps best be seen in FIGS. 1 and 2, and extends laterally across the machine, and includes a base frame section 111, and an outer frame section 112. These two frame sections are pivotally mounted together below the lower side of the conveyor adjacent the lower ends of upright frame members 113 and 114. The frame members 113 and 114 are bolted together as shown in FIG. 1 in working position. The outer frame section 112 can be folded down for transport by unbolting the frame members 113 and 114 and permitting frame section 112 to swing down.

The frame section 111 is supported on suitable upright supports 115 that are fastened at their lower ends to the frame 13, and as shown the frame section 111 is used for mounting a first end conveyor roller 116 on suitable bearings, and the outer end of frame section 112 has a conveyor roller 117 mounted thereon. A conveyor belt 118 is mounted over the rollers 116 and 117. There is a single conveyor belt in the conveyor assembly 110 which extends across both frame sections.

The base or lower end of the conveyor frame 111, has a hopper 120 formed thereon which has substantial depth, as shown, and at the forward side of the hopper, a screen (heavy mesh) opening 121 is provided so that an operator can see into the hopper. The hopper is made of upright walls including a forward wall 122, and opening 121 is cut into the forward wall and covered with heavy mesh. The screen opening 121 permits to see rocks that are stored in the hopper end of the conveyor 110. The conveyor hopper forward wall 122 extends upwardly a substantial distance along the side wall members of the conveyor frame section 111. The hopper 120, as can be seen in FIG. 1 is positioned directly below the discharge end of the conveyor assembly 60, and so that rocks coming off the upper end of conveyor 60 will be dropped into the hopper 120, and thus rest on the upper length of the conveyor belt 118.

The conveyor belt 118 is driven by the roller 117. The drive to roller 17 shown generally at 130 is carried out in two stages and the first drive belt 131 is driven from a pulley 132 (FIGS. 1 and 7), which is mounted on the shaft 93 which is driven by shaft 95. The belt 131 (multiple, parallel belts are actually used to transmit the required power) is mounted over pulley 133. The pulley 133 is mounted on a shaft 134 that is rotatably mounted below and with respect to the upper conveyor frame section 112 in suitable bearings. The shaft 134 is spaced upwardly from the pivot between the two conveyor frame sections 111 and 112. The shaft 134 has a drive sprocket thereon which drives a chain 135. The chain 135 in turn drives a sprocket 136 which is drivably mounted on the shaft for the roller 117. The conveyor belt 118 is thus driven when the drive arrangement is engaged so that the upper length of conveyor belt 118 moves as indicated by the arrow 140.

The belt 131 is driven only when a tightener assembly 141 is tightened down (see FIG. 8). The tightener assembly includes a pulley 141A that is mounted on an arm 142 which in turn is pivotally mounted as at 143 to a post forming part of the supports 115. The pulley 141A is spring loaded with a spring 145 so that it is urged away from the belt 131. A pull rope 144 is used for pulling the tightener assembly 141 downwardly to tighten the belt and to effect the drive to the shaft 134 through the pulley 133. The conveyor belt 118 is driven only when the rope 144 is tightened. Rope 144 also can be controlled by lever 79A. The roller 117 has lagging on it for higher load capacity.

The forward side wall of the conveyor frame section 112 has an opening cut therein and covered with suitable bars indicated at 150 that permit a person to see into the conveyor assembly to see rocks that are carried on the belt 118 near its outer or discharge end to observe when the storage conveyor 110 is filled.

A large blower 152 is mounted on a frame 153 adjacent the discharge end of conveyor 60. The blower is driven with belts 154 which in turn are driven by a pulley on shaft 93. The blower outlet directs a lifting upward blast of air through the rocks falling into hopper 120 to blow trash and dirt out of the rocks.

Figure 3:
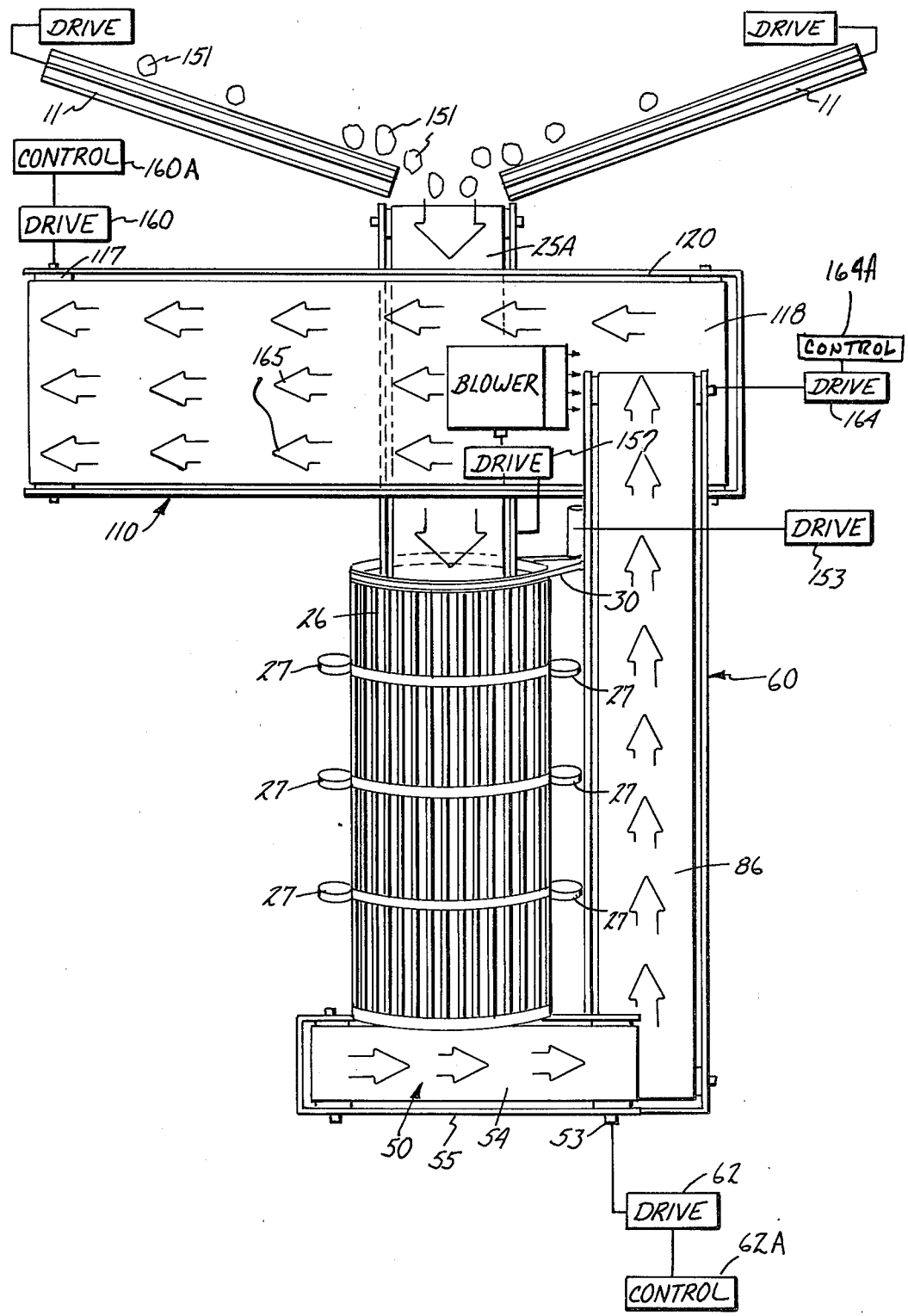
FIG. 3 is a top plan schematic representation of the conveyor flow of the rock picker shown in FIG. 1.

Referring to FIG. 3 in particular, and the schematic showing therein, the rocks indicated generally at 151 that are entering the rock picker are carried by the conveyor belt 25A, which is driven by the drive shown schematically at 157. The rocks are dropped into the tumbler 26 which is also driven through the drive belt 30 in a known manner. The rocks are discharged onto the conveyor assembly 50 and carried by the conveyor belt shown at 54. The drive for conveyor belt 54, indicated at 62 is controlled by a rope control shown as a box 62A that is a manual control operable to selectively disengage the drive and stop the conveyor belt 54.

The rocks which are discharged from the upper end of the conveyor belt 54 are dropped onto the conveyor belt 86 of the conveyor 60 and moved longitudinally alongside the machine and then are dropped onto the conveyor belt 118 that is on the cross storage conveyor assembly 110.

The drive for the cross conveyor is shown schematically at 160 and is controlled with a control 160A, to drive the outer roller 117 under manual control, to move the conveyor belt 118 only when desired. The hopper sides 120 are sufficiently high so that a substantial number of rocks can be stored in the hopper and then the conveyor belt 118 will be driven a short distance to move some of the rocks away from the hopper. The belt 86 continues to drop rocks into the hopper 120. The conveyor belt 118 is inched along in direction as indicated by the arrows 165, until the rocks that are first moved from the hopper are positioned adjacent the discharge end. A layer of rocks is thus stored on belt 118 and it can be seen through the rods 150. When the conveyor is filled, the rocks can be dumped by running the conveyor belt 118 until it is empty.

The drives for the conveyors can be hydraulic motors individually controlled by the operator through valves. The conveyor 60 can have a drive 164 with a control 164A to insure that it is driven as desired. Normally the conveyor 60 and conveyor belt 86 are driven continuously while conveyor belt 54 can be stopped manually. Belt 54 generally is stopped at the time that the conveyor belt 118 is driven.

Figure 4:
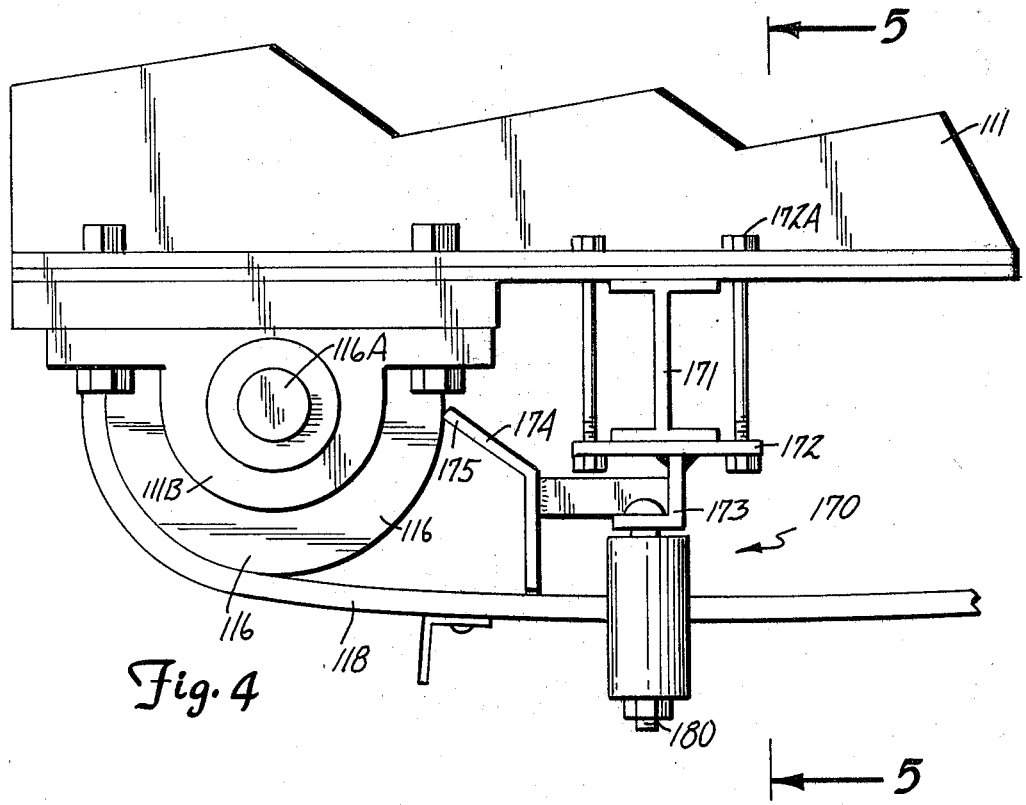
FIG. 4 is a side view of one of the rollers for a typical conveyor used with the present invention showing a scraper utilized to keep the belt and roller clean.
Figure 5:
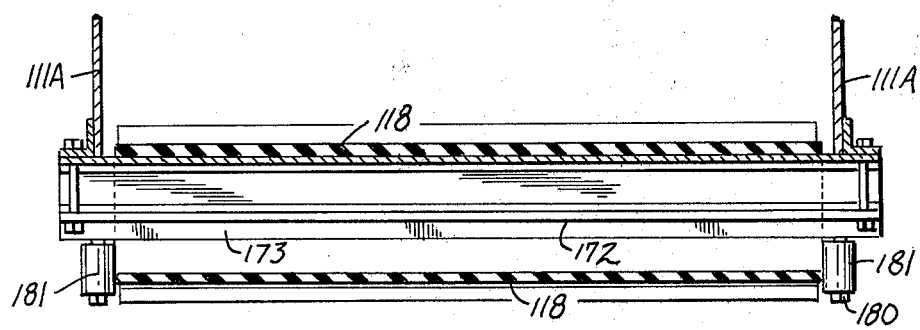
FIG. 5 is a sectional view taken as on line 5—5 in FIG. 4.

Referring to FIGS. 4 and 5 in particular, a typical roller for mounting conveyor belts used with the present invention is shown, and in particular the roller is illustrated as roller 116 for the conveyor assembly 117. The conveyor frame section 111 as shown has a lower flange 111A that is used for mounting a suitable bearing 111B. A shaft 116A is supported in bearing 111B and in turn the roller 116 is mounted on shaft 116A. The belt 118 is shown, and is mounted around the roller 116 in a normal manner. The conveyor belt 118 and the other conveyor belts have cleats on them much like angle irons. One of the cleats is shown at 118A in FIG. 4.

In order to keep the roller 116, as well as the rest of the rollers for mounting the conveyor belts clean, a scraper assembly 170 is used.

The side members 111A of conveyor section 111 and the side members of the other conveyors corresponding to side frame members 111A shown in FIG. 4 are held together with I beam cross members such as that shown at 171. A plate 172 that is held onto the side frame members 111A and clamped against the bottom of the cross member 111 with suitable bolts 172A. The bracket plate 172 thus is clamped tightly in place and supports an angle iron bracket 173 which in turn is used for supporting a scraper blade 174. The scraper blade 174 has an end portion 175 that is positioned closely adjacent the surface of the roller 116, and serves to prevent material from building up on the roller 116 as the roller rotates in the direction as indicated by the arrow 178. The lower end of the bracket 174 has an end portion 176 that is closely positioned adjacent the inner surface of the belt 118 as shown, and serves to scrape off any materials that may have collected on the inner surface of the belt to prevent such materials from being carried into the roller on the belt and pinched between the roller and the belt and thus gumming up the roller and belt.

Additionally, the cross member 173 has vertical guide pins 180 mounted at the opposite ends thereof below the side frame members 111A, and these pins in turn rotatably mount rollers 181, on opposite sides of the belt 118 to guide the belt properly as it moves over the roller 116.

Each of the conveyor belts are mounted rollers that in turn are supported on side frames as shown typically. It should be noted that the side frames 111A have short upwardly extending walls, and the conveyors 50 and 60 also have upwardly extending walls extending above the top length of the conveyor belt. The showing in FIGS. 4 and 5 is typical of the conveyor rollers for the other conveyors as well.

It should be noted that cleats are mounted onto each of the conveyor belts too, and in FIG. 4 such cleats are shown as angle irons 118A fastened suitably to the belt.

The device of the present invention is used for not only picking rocks, but also for beach cleaning, for example. The windrower rollers at the front of the machine cover a wide swath and gather materials in toward the machine cutter where the materials are lifted, passed through the tumbler and transferred to the conveyors. The conveyors store a substantial amount of material (debris, bottles, etc. as well as rocks) before dumping is necessary.

The device also works for landscape leveling and finishing work. The rollers at the front will tend to level the ground surface as the machine moves over the ground leaving a smooth, leveled seed bed.

With certain modifications the device can be used for screening small size particulate materials, such as sand or black dirt. The dirt falls through the tumbler (which can have a screen lining) and can be saved. Debris, clods, and rocks will be conveyed away and stored in the conveyor.

The discharge end of the front conveyor is off the ground, as shown, so it can load a truck without need for a lift or dumping box. The conveyor inclination from horizontal is low enough so the rocks and debris do not roll back to the hopper while they are stored.

What is claimed is:

1. In a rock picker having a longitudinally extending frame, means for lifting rocks or the like from the ground, conveyor means having a longitudinal axis and in position to receive rocks from the means for lifting, the improvement comprising said conveyor means including means to manually control the operation thereof to permit intermittent operation, said conveyor means being normally stopped and being operable to move rocks dropped on the conveyor means to different locations along the longitudinal axis thereof such that rocks are stored on the conveyor means at selected locations by selectively operating the conveyor means, said conveyor means including a conveyor frame, upwardly extending side walls on said conveyor frame, said conveyor frame having one side wall facing the operator at the forward end of the rock picker, and an opening in said side wall member adjacent the discharge end of the conveyor means, means covering the opening effective for preventing rocks from falling through the opening, but permitting the operator to view rocks supported on said conveyor means at the location of the opening.

2. The rock picker of claim 1 wherein said conveyor means includes a conveyor member having its longitudinal axis extending transverse to the frame longitudinal axis and positioned adjacent the leading end of the machine ahead of at least a substantial portion of the rock picker frame, other portions of the conveyor means transporting rocks from the means for lifting to the conveyor member.

3. The rock picker of claim 2 wherein the conveyor means includes a first conveyor that receives rocks from the means for lifting and conveys the rocks laterally at the rear of the frame, a second conveyor positioned to receive rocks from the first conveyor and extending longitudinally of the frame to deposit rocks in said conveyor member.

4. The rock picker of claim 3 wherein said conveyor member is the intermittently operated conveyor and normally is not driven, and power means to drive the first and second conveyors.

5. A rock picker having a longitudinally extending frame, means for lifting rocks from the surface of the ground and transporting the rocks longitudinally rearwardly to a normal discharge point at the rear of the rock picker, a first conveyor member receiving rocks at the normal discharge point at the rear of the rock picker and transporting rocks from the normal discharge point laterally toward one side of the frame, a second conveyor mounted on the frame and extending longitudinally along and closely adjacent the one side of the frame from the rear toward the front, a third conveyor positioned adjacent the front end of the frame and extending transversely to the frame, support means on said frame supporting said third conveyor in position elevated above and extending across the means for lifting, said third conveyor having an input end positioned to receive the rocks carried by the second conveyor and having a discharge end extending a desired distance outwardly from the side of the frame opposite the one side and being at a level and position to permit discharge of rocks from the discharge end of the third conveyor into a mobile container, power means to normally drive said first and second conveyors to convey rocks from the means for lifting back toward the front of the rock picker, and means to selectively power the third conveyor intermittently under manual controls such that rocks are deposited on the third conveyor by the second conveyor at selected locations on the third conveyor by selectively powering the third conveyor to store rocks at a selected depth on the third conveyor substantially along its length thereof, said third conveyor also being selectively operable to remove rocks therefrom.

6. A combination of claim 5 and a blower means mounted on the frame adjacent the portion of the third conveyor which receives rocks from the second conveyor, said second conveyor delivering the rocks to the third conveyor above the third conveyor so the rocks drop onto the third conveyor, said blower directing a stream of air across the space through which rocks drop from the second conveyor to the third conveyor.

* * * * *